United States Patent
Amano et al.

(10) Patent No.: US 9,083,023 B2
(45) Date of Patent: Jul. 14, 2015

(54) FUEL CELL SYSTEM AND DESULFURIZATION UNIT FOR THE SAME

(75) Inventors: Takashi Amano, Nagoya (JP); Hiroki Ohkawara, Okazaki (JP); Shin Iwata, Kobe (JP); Susumu Takami, Osaka (JP)

(73) Assignees: AISIN SEIKI KABUSHIKI KAISHA, Kariya-shi (JP); OSAKA GAS CO., LTD., Osaka-shi (JP)

( * ) Notice: Subject to any disclaimer, the term of this patent is extended or adjusted under 35 U.S.C. 154(b) by 683 days.

(21) Appl. No.: 13/368,723

(22) Filed: Feb. 8, 2012

(65) Prior Publication Data

US 2012/0208097 A1 Aug. 16, 2012

(30) Foreign Application Priority Data

Feb. 10, 2011 (JP) ................. 2011-026645

(51) Int. Cl.
- H01M 8/06 (2006.01)
- C10G 25/00 (2006.01)
- H01M 8/04 (2006.01)
- B01D 53/00 (2006.01)
- H01M 8/12 (2006.01)

(52) U.S. Cl.
CPC .............. H01M 8/0675 (2013.01); B01D 53/00 (2013.01); C10G 25/00 (2013.01); H01M 8/04089 (2013.01); H01M 8/0618 (2013.01); C10G 2300/202 (2013.01); C10G 2300/4006 (2013.01); H01M 2008/1293 (2013.01); Y02E 60/50 (2013.01); Y02E 60/525 (2013.01)

(58) Field of Classification Search
CPC .......... H01M 8/04089; H01M 8/0618; H01M 8/0675
See application file for complete search history.

(56) References Cited

U.S. PATENT DOCUMENTS

| | | | |
|---|---|---|---|
| 2005/0164051 A1* | 7/2005 | Venkataraman et al. | ....... 429/17 |
| 2011/0247493 A1 | 10/2011 | Hatscher | |

FOREIGN PATENT DOCUMENTS

| | | |
|---|---|---|
| CA | 2 746 835 A1 | 6/2010 |
| JP | 5-114414 | 5/1993 |
| JP | 2006-111766 | 4/2006 |
| JP | 2006-137649 A | 6/2006 |
| JP | 2006-265480 | 10/2006 |
| JP | 2008-138153 A | 6/2008 |
| JP | 2008-169100 A | 7/2008 |

(Continued)

OTHER PUBLICATIONS

Office Action issued Jun. 6, 2013 in Japanese Application No. 2011-026645 (With English Translation).

(Continued)

*Primary Examiner* — Helen O Conley
(74) *Attorney, Agent, or Firm* — Oblon, McClelland, Maier & Neustadt, L.L.P.

(57) ABSTRACT

A desulfurization unit for a fuel cell system includes a first desulfurizer arranged in a temperature environment ranging from 50° C. to 200° C. and accommodating a desulfurizing agent including a porous material serving as a base material, the desulfurizing agent exerting a desulfurization effect in a normal temperature range, the first desulfurizer adsorbing a sulfur compound included in a source gas in the temperature environment ranging from 50° C. to 200° C. when the source gas having a low dew point is supplied through a source gas passage to the first desulfurizer and when the source gas having a high dew point is supplied through the source gas passage to the first desulfurizer.

6 Claims, 8 Drawing Sheets

(56) References Cited

FOREIGN PATENT DOCUMENTS

| | | |
|---|---|---|
| JP | 2010-260772 | 11/2010 |
| JP | 2011-96400 | 5/2011 |
| JP | 2012-138265 A | 7/2012 |

OTHER PUBLICATIONS

Extended European Search Report issued Mar. 28, 2013 in Patent Application No. 12154630.3.

Office Action issued Jan. 29, 2013 in Japanese Patent Application No. 2011-026645 (with English translation).

* cited by examiner

F I G. 1
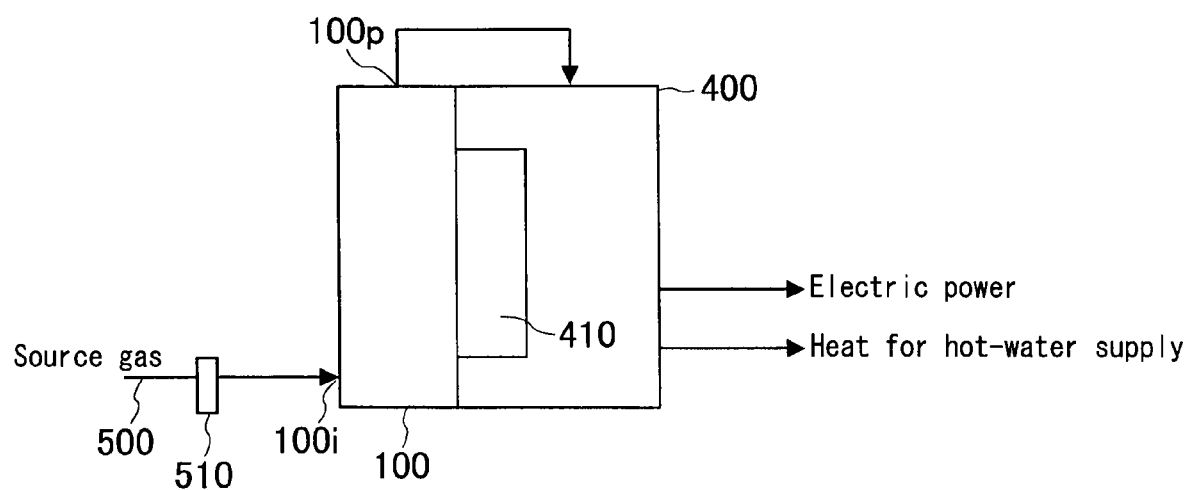

FUEL CELL SYSTEM AND DESULFURIZATION UNIT FOR THE SAME

CROSS REFERENCE TO RELATED APPLICATIONS

This application is based on and claims priority under 35 U.S.C. §119 to Japanese Patent Application 2011-026645, filed on Feb. 10, 2011, the entire content of which is incorporated herein by reference.

TECHNICAL FIELD

This disclosure generally relates to a fuel cell system and a desulfurization unit for the same.

BACKGROUND DISCUSSION

A known desulfurization unit for LPG (corresponding to a source gas) is disclosed in JP2006-111766A (which will be hereinafter referred to as Reference 1). The desulfurization unit of Reference 1 includes first and second desulfurizers separately set at normal and high temperatures (the high temperature is higher than 100° C.). A desulfurizing agent for the first desulfurizer is utilized at normal temperature to adsorb odorous sulfur compounds such as tertiary-butylmercaptan (TBM), dimethyl sulfide (DMS), and the like that are included in a city gas (for example, a city gas 13A). The odorous sulfur compounds are relatively easily removed from the city gas by the desulfurizing agent of the first desulfurizer used at normal temperature. A desulfurizing agent for the second desulfurizer adsorbs sulfur compounds specifically included in LPG, by use of metal oxide such as nickel (Ni). The sulfur compounds included in LPG are, for example, carbonyl sulfide (COS) and the like that are relatively easily adsorbed by the desulfurizing agent. An operating temperature of the second desulfurizer depends on a desulfurization effect of the desulfurizing agent of the second desulfurizer.

JP2006-265480A (which will be hereinafter referred to as Reference 2) discloses a desulfurization unit basically including the same configuration as that of Reference 1. In particular, the desulfurization unit of Reference 2 includes a first desulfurizer operating at normal temperature and a second desulfurizer operating at a high temperature of 50° C. or higher. A desulfurizing agent accommodated in the second desulfurizer is used at the high temperature of 50° C. or higher. The desulfurizing agent of the second desulfurizer is provided for LPG. JPH5-114414A (which will be hereinafter referred to as Reference 3) discloses a first desulfurizer used at normal temperature and a second desulfurizer used at high temperature. The second desulfurizer serves as a hydrogenation desulfurizer. That is, according to Reference 3, two desulfurization methods are combined so that the first desulfurizer covers an insufficiency of a desulfurization effect of the hydrogenation desulfurizer when the fuel cell generating system is started.

According to Reference 1, the second desulfurizer used at high temperature adsorbs the sulfur compounds specifically included in LPG by use of metal oxide or the like, thereby removing the sulfur compounds from LPG. The second desulfurizer is not intended to inhibit the desulfurizing agent of the first desulfurizer from being damaged by water vapor included in the source gas. According to Reference 3, the second desulfurizer used at high temperature is intended to perform a hydrogenation desulfurization. Hydrogen is necessary for the hydrogenation desulfurization.

For example, the source gas corresponding to a city gas supplied by a gas company may include water vapor. The desulfurizing agent used at normal temperature is formed by a porous material serving as a base material. The porous material is, for example, zeolite, activated carbon, or the like. The desulfurizing agent including the porous material serving as the base material is used in a normal temperature environment, thereby adsorbing the sulfur compounds of the source gas to remove the sulfur compounds from the source gas (the desulfurizing agent used in the normal temperature environment will be hereinafter referred to as a normal-temperature desulfurizing agent). The normal-temperature desulfurizing agent including the porous material serving as the base material is inexpensive. However, for example, in a case where a source gas having a high dew point and including a large volume of water vapor is desulfurized by the normal-temperature desulfurizing agent, the normal-temperature desulfurizing agent may preferentially adsorb the water vapor to sulfur compounds of the source gas. As a result, the sulfur adsorption capacity of the normal-temperature desulfurizing agent may drastically decrease, therefore deteriorating the desulfurization effect of the normal-temperature desulfurizing agent (see FIG. 11).

A source gas having a low dew point and including a small volume of water vapor is generally supplied to the industrial world. However, for example, when a gas fitting work or a gas-pipe laying work is performed, the water vapor included in the source gas increases; therefore, the low dew point of the source gas may increase. Here, for example, the normal-temperature desulfurizing agent including the porous material such as zeolite is used at normal temperature to desulfurize the source gas having the increased dew point. In such case, the water vapor of the source gas may drastically decrease the sulfur adsorption capacity of the normal-temperature desulfurizing agent, therefore deteriorating the desulfurization effect of the normal-temperature desulfurizing agent. In addition, the normal-temperature desulfurizing agent preferentially adsorbs the water vapor to sulfur compounds of the source gas, therefore shortening a life-span of the normal-temperature desulfurizing agent. Consequently, in order to inhibit the desulfurization effect of the normal-temperature desulfurizing agent from deteriorating, a use amount of the normal-temperature desulfurizing agent needs to be increased more than necessary to desulfurize the source gas, resulting in a cost increase and an enlargement of a fuel cell system.

A need thus exists for a fuel cell system and a desulfurization unit for the same, which are not susceptible to the drawback mentioned above.

SUMMARY

According to an aspect of this disclosure, a desulfurization unit for a fuel cell system includes a first desulfurizer arranged in a temperature environment ranging from 50° C. to 200° C. and accommodating a desulfurizing agent including a porous material serving as a base material, the desulfurizing agent exerting a desulfurization effect in a normal temperature range, the first desulfurizer adsorbing a sulfur compound included in a source gas in the temperature environment ranging from 50° C. to 200° C. when the source gas having a low dew point is supplied through a source gas passage to the first desulfurizer and when the source gas having a high dew point is supplied through the source gas passage to the first desulfurizer.

According to another aspect of this disclosure, a fuel cell system includes a fuel cell including an anode and a cathode, a cathode gas exhaust passage supplying a cathode gas to the cathode of the fuel cell, a reformer reforming a source gas to generate an anode gas, the reformer configuring a portion of a power generation module, a source gas passage supplying the source gas from a gas source to the reformer, a desulfurization unit arranged at the source gas passage and desulfurizing the source gas, to the first desulfurizer, and an anode gas passage) supplying the anode gas generated by the reformer to the anode of the fuel cell, the desulfurization unit including a first desulfurizer arranged in a temperature environment ranging from 50° C. to 200° C. and accommodating a desulfurizing agent including a porous material serving as a base material, the desulfurizing agent exerting a desulfurization effect in a normal temperature range, the first desulfurizer adsorbing a sulfur compound included in a source gas in the temperature environment ranging from 50° C. to 200° C. when the source gas having a low dew point is supplied through a source gas passage to the first desulfurizer and when the source gas having a high dew point is supplied through the source gas passage.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a conceptual figure illustrating a desulfurization unit arranged at a fuel cell system according to a first embodiment disclosed here;

DETAILED DESCRIPTION

Figure 2A:
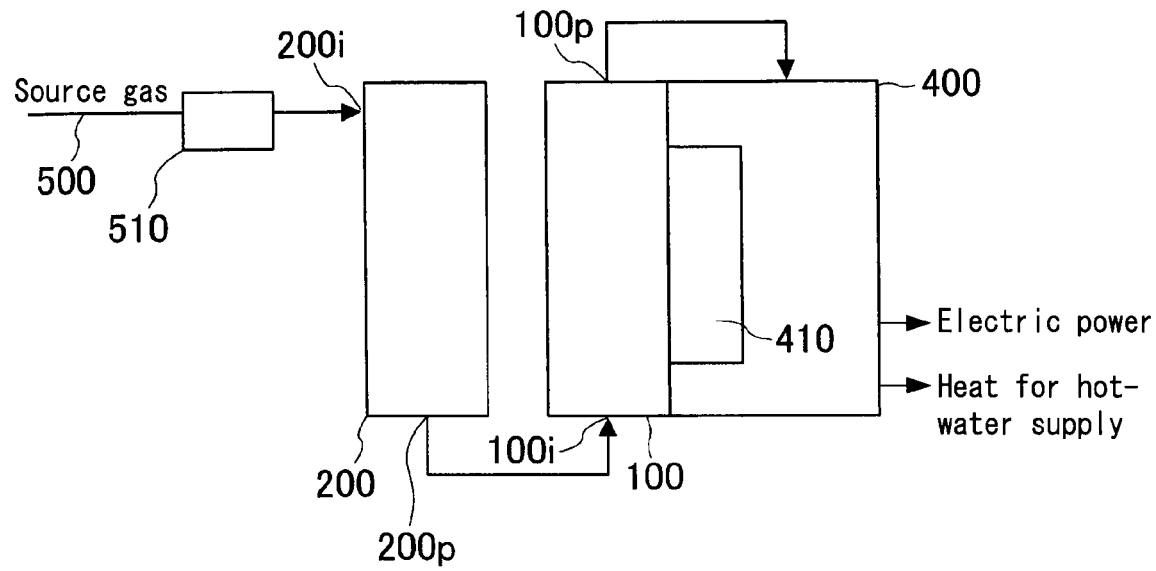
FIG. 2A is a conceptual figure illustrating the desulfurization unit arranged at the fuel cell system according to a second embodiment of the disclosure.

A desulfurizing agent including a porous material serving as a base material is, for example, zeolite, metal-carrying zeolite where the metal is, for example, transition metal, activated carbon, or metallic oxide (for example, alumina, ceria, or the like). The porous material serving as the base material will be referred to as a porous base material. The desulfurizing agent exerts a desulfurization effect under a normal temperature range that ranges from 0° C. to 50° C. (exclusive of 50° C.). The desulfurizing agent will be hereinafter referred to as a normal-temperature desulfurizing agent. Adsorption of the normal-temperature desulfurizing agent may be physical adsorption. Alternatively, in a case where the normal-temperature desulfurizing agent includes metal such as transition metal, the adsorption of the normal-temperature desulfurizing agent may be physical and chemical adsorption. Zeolite is aluminosilicate mineral forming a microporous crystal structure. Zeolite may be natural or artificial zeolite.

The normal-temperature desulfurizing agent including the porous base material physically adsorbs sulfur compounds (for example, methyl mercaptan, dimethyl sulfide, and dimethyl disulfide) included in a source gas. In addition, the normal-temperature desulfurizing agent physically adsorbs water vapor, hydrocarbons (HC), and the like that are included in the source gas. Therefore, the adsorption capacity of the normal-temperature desulfurizing agent changes depending on types of substances (for example, the water vapor) to be adsorbed by the normal-temperature desulfurizing agent. In addition, the adsorption capacity of the normal-temperature desulfurizing agent varies with a temperature of the normal-temperature desulfurizing agent. The adsorption capacity of the normal-temperature desulfurizing agent is easily hindered by the water vapor, particularly, under the normal temperature range. At least one of silver, copper, gold, rhodium, palladium, iridium, ruthenium, osmium, nickel, iron, chromium, and molybdenum may be cited as an example of the metal included in the normal-temperature desulfurizing agent. In addition, an alloy including two or more substances from silver, copper, gold, rhodium, palladium, iridium, ruthenium, osmium, nickel, iron, chromium, and molybdenum may be cited as another example of the metal included in the normal-temperature desulfurizing agent. Here, among substances hindering the adsorption capacity of the normal-temperature desulfurizing agent, the water vapor included in the source gas may cause the worst influence on the adsorption capacity of the normal-temperature desulfurizing agent. The normal-temperature desulfurizing agent preferentially adsorbs the water vapor included in the source gas; therefore, it is difficult for the normal-temperature desulfurizing agent to adsorb the sulfur compounds. Accordingly, in a case where sulfur compounds of a source gas having a low dew point (for example, 0° C. or lower, −10° C. or lower) is removed from the source gas by the normal-temperature desulfurizing agent, the volume of water vapor included in the source gas is small and the water vapor therefore does not have a large influence on the adsorption capacity of the normal-temperature desulfurizing agent for the sulfur compounds included in the source gas. As a result, the adsorption capacity of the normal-temperature desulfurizing agent may be effectively exerted.

On the other hand, in a case where a source gas having a high dew point passes through the normal-temperature desulfurizing agent, the volume of water vapor included in the source gas is large. Accordingly, the adsorption capacity of the normal-temperature desulfurizing agent for sulfur compounds included in the source gas is easily affected by the water vapor included in the source gas; therefore, the adsorption capacity of the normal-temperature desulfurizing agent drastically decreases. In such case, the lower an operating temperature of a desulfurizer accommodating the normal-temperature desulfurizing agent is, the further drastically the water vapor is adsorbed by the normal-temperature desulfurizing agent. As a result, the sulfur compounds included in the source gas are less adsorbed by the normal-temperature desulfurizing agent, therefore deteriorating the adsorption capacity of the normal-temperature desulfurizing agent for the sulfur compounds. However, for example, in a case where a temperature environment of the normal-temperature desulfurizing agent having the characteristics described above reaches a high temperature that ranging from 50° C. to 200° C., the water vapor included in the source gas is less adsorbed by the normal-temperature desulfurizing agent. Consequently, the influence of the water vapor of the source gas on the adsorption capacity of the normal-temperature desulfurizing agent drastically decreases. As a result, the normal-temperature desulfurizing agent may appropriately adsorb the sulfur compounds.

Figure 11:
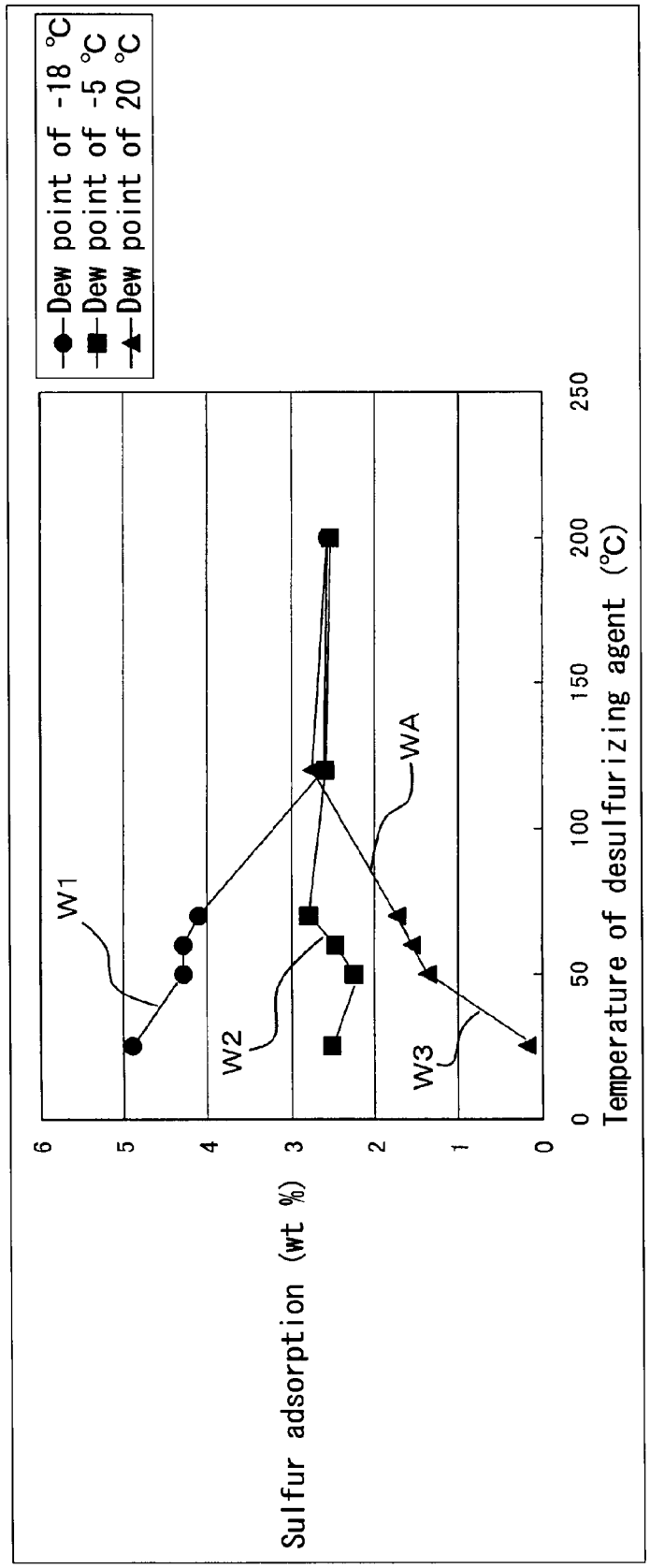
FIG. 11 is a graph illustrating relations among a temperature of a desulfurizing agent including a desulfurizing agent used at normal temperature, sulfur adsorption capacity, and a dew point of the source gas.

FIG. 11 is a graph illustrating relations among a temperature of a desulfurizing agent including a desulfurizing agent used at normal temperature, the sulfur adsorption capacity, and a dew point of a source gas. The sulfur adsorption capacity of the desulfurizing agent (normal-temperature desulfurizing agent) is indicated by a weight percentage of sulfur adsorbed from the source gas by the normal-temperature desulfurizing agent relative to a weight of the normal-temperature desulfurizing agent, and a dew point of the source gas desulfurized by the normal-temperature desulfurizing agent. In FIG. 11, a characteristic line W1 is specified for a source gas having a dew point of −18° C. In FIG. 11, a characteristic line W2 is specified for a source gas having a dew point of −5° C. In FIG. 11, a characteristic line W3 is specified for a source gas having a dew point of +20° C. In the case that the source gas has the low dew point of −18° C. or in the case that the source gas has the low dew point of −5° C., the volume of water vapor included in the source gas is small. Therefore, even when the temperature of the normal-temperature desulfurizing agent changes in a range from 20° C. to 120° C. as indicated by the characteristic lines W1 and W2, the sulfur adsorption capacity of the normal-temperature desulfurizing agent may be appropriately maintained. On the other hand, in the case that the source gas has the high dew point of +20° C. as indicated by the characteristic line W3, the volume of the water vapor included in the source gas is large. Accordingly, the sulfur adsorption capacity of the normal-temperature desulfurizing agent is affected by the water vapor; therefore, the sulfur adsorption capacity deteriorates. As indicated by the characteristic line W3, when the temperature of the normal-temperature desulfurizing agent reaches a range from 20° C. to 50° C. (exclusive of 50° C.), the sulfur adsorption capacity of the normal-temperature desulfurizing agent drastically decreases.

The normal-temperature desulfurizing agent including the porous base material has characteristics described above. However, for example, in a state where the temperature of the normal-temperature desulfurizing agent is at a high temperature ranging from 50° C. to 120° C., the source gas having the dew point of +20° C. passes through the normal-temperature desulfurizing agent. At this time, as seen from a portion WA of the characteristic line W3 indicated in FIG. 11, the sulfur adsorption capacity of the normal-temperature desulfurizing agent is slightly low compared to the case where the source gas having the low dew point passes through the normal-temperature desulfurizing agent; however, the sulfur adsorption capacity of the normal-temperature desulfurizing agent may be appropriately secured. Further, for example, in a state where the temperature of the normal-temperature desulfurizing agent is at a high temperature ranging from 120° C. to 200° C., the source gas having the dew point of +20° C. passes through the normal-temperature desulfurizing agent. At this time, the sulfur adsorption capacity of the normal-temperature desulfurizing agent may be appropriately secured in the same way as in the case where the temperature of the normal-temperature desulfurizing agent is at the high temperature ranging from 50° C. to 120° C.

As described above, in a case where the source gas having the high dew point passes through the normal-temperature desulfurizing agent including the porous base material, the sulfur adsorption capacity of the normal-temperature desulfurizing agent drastically decreases. However, the normal-temperature desulfurizing agent is set in the high temperature environment ranging from 50° C. to 200° C.; thereby, the sulfur adsorption capacity of the normal-temperature desulfurizing agent may be appropriately secured relative to the source gas having the high dew point and including the large volume of water vapor. In addition, the sulfur adsorption capacity of the normal-temperature desulfurizing agent may be appropriately secured relative to the source gas having the low dew point and including the small volume of water vapor.

It is appropriate that a first desulfurizer accommodating the normal-temperature desulfurizing agent is set in the temperature environment ranging from 50° C. to 200° C. In particular, it is appropriate for the temperature range of the first desulfurizer to range from 50° C. to 130° C. Further, it is appropriate for the temperature range of the first desulfurizer to range from 55° C. to 99° C. and from 55° C. to 80° C. For example, the first desulfurizer operating at a high temperature of approximately 60° C. is applicable. Meanwhile, in a state where the temperature environment of the normal-temperature desulfurizing agent is in the normal temperature range from 0° C. to 50° C. (exclusive of 50° C.), the sulfur adsorption capacity of the normal-temperature desulfurizing agent is drastically decreased by the water vapor of the source gas as indicated by the characteristic line W3 in FIG. 11. Therefore, it is appropriate for the first desulfurizer to be used at 50° C. or higher. A second desulfurizer used at 50° C. or lower is mainly intended to remove the sulfur compounds from the source gas having the low dew point. The volume of the normal-temperature desulfurizing agent to be filled into the second desulfurizer used at 50° C. or lower is determined so that the sum of an amount of the sulfur compounds adsorbed by the first desulfurizer and an amount of the sulfur compounds adsorbed by the second desulfurizer may be a desired adsorption amount of the sulfur compounds.

The source gas generally has the low dew point (for example, 0° C. or lower, −10° C. or lower). The volume of the water vapor included in the source gas is small. However, for example, in a case where a gas-pipe laying work is performed, the volume of the water vapor included in the source gas increases and the dew point of the source gas may be therefore increased. In such case, it is appropriate for the source gas to be desulfurized by both the first desulfurizer used at high temperature and the second desulfurizer used at low temperature. In addition, it is appropriate that the second desulfurizer accommodating the normal-temperature desulfurizing agent is arranged in series with or in parallel with the first desulfurizer and in the normal temperature environment that is lower than 50° C.

First Embodiment

FIG. 1 illustrates a desulfurization unit for a fuel cell system 400 according to a first embodiment of the disclosure. The desulfurization unit according to the first embodiment includes a first desulfurizer 100 accommodating a desulfurizing agent including a porous material serving as a base material (the porous material serving as the base material will be hereinafter referred to as the porous base material). The desulfurizing agent exerts a desulfurization effect under the normal temperature range from 0° C. to 50° C. (exclusive of 50° C.). The desulfurizing agent will be hereinafter referred to as a normal-temperature desulfurizing agent. In the first embodiment, the first desulfurizer 100 is set in the temperature environment ranging from 50° C. to 200° C. In particular, the first desulfurizer 100 includes an inlet port 100i and an outlet port 100p. The first desulfurizer 100 is arranged next to a heat source 410 in the fuel cell system 400 so as to receive heat from the heat source 410. The normal-temperature desulfurizing agent accommodated in the first desulfurizer 100 is heated by the heat transmitted from the heat source 410. Therefore, the normal-temperature desulfurizing agent accommodated in the first desulfurizer 100 is heated, for example, by thermal conduction or by thermal radiation due to the heat transmitted from the heat source 410. The heat source 410 includes a reformer generating an anode gas by reforming a source gas, a fuel cell, an insulated wall covering the reformer, and the like. For example, in a case where a hot-water chamber is arranged at the fuel cell system 400, the heat source 410 includes a hot-water passage connecting to the hot-water chamber, an exhaust gas passage through which a high-temperature exhaust gas from the reformer or the fuel cell flows, and the like. In addition, the heat source 410 further includes an electric heater. The normal-temperature desulfurizing agent is, for example, zeolite or metal-carrying zeolite where the metal is silver or copper. Alternatively, the normal-temperature desulfurizing agent may be a porous material such as activated carbon. The normal-temperature desulfurizing agent may not have a specific shape and a specific size. For example, the normal-temperature desulfurizing agent may be formed of grains each having a diameter of 1 millimeter to 2 millimeters. Further, the normal-temperature desulfurizing agent may be formed of cylinder solids each having a circular cross-section perpendicular to a longitudinal direction of the cylinder solid. The circular cross-section has a diameter of 1 millimeter to 2 millimeters. Furthermore, the normal-temperature desulfurizing agent may be formed in a different form from the grains or the cylindrical solids. A dew-point meter 510 and the first desulfurizer 100 are arranged at a source gas passage 500 led out from a gas source. According to the desulfurization unit of the first embodiment, the source gas including sulfur compounds is supplied from the gas source and is transferred from the source gas passage 500 through the dew-point meter 510 to the first desulfurizer 100. Therefore, the source gas is desulfurized in the temperature environment ranging from 50° C. to 200° C. by the normal-temperature desulfurizing agent including the porous material and being accommodated in the first desulfurizer 100. The source gas is, for example, a hydrocarbon gas.

The source gas, for example, a city gas (for example, a city gas 13A) generally has a low dew point (for example, 0° C. or lower, −10° C. or lower). The volume of the water vapor included in the source gas is small. However, for example, in a case where a gas-pipe laying work is performed, the volume of the water vapor included in the source gas increases and the dew point of the source gas may be therefore increased. According to the desulfurization unit of the first embodiment, the normal-temperature desulfurizing agent including the porous material and being accommodated in the first desulfurizer 100 may appropriately desulfurize the source gas having the low dew point and including the small volume of water vapor. Additionally, according to the first embodiment, the normal-temperature desulfurizing agent may appropriately desulfurize the source gas having the high dew point and including the large volume of water vapor. As described above, according to the desulfurization unit of the first embodiment, even in the case that the dew point of the source gas varies when a gas fitting work or a gas-pipe laying work is performed, the first desulfurizer 100 accommodating the normal-temperature desulfurizing agent having zeolite may appropriately desulfurize the source gas. In addition, under the condition where the first desulfurizer 100 is set in the temperature environment ranging from 50° C. to 200° C., the sulfur adsorption capacity of the normal-temperature desulfurizing agent is refrained from being affected by the water vapor included in the source gas. Therefore, a life-span of the normal-temperature desulfurizing agent accommodated in the first desulfurizer 100 may be refrained from shortening. Moreover, according to the first embodiment, the sulfur adsorption capacity of the normal-temperature desulfurizing agent is determined by an operating temperature of the first desulfurizer 100 and by the dew point of the source gas. Therefore, the weight of the normal-temperature desulfurizing agent to be filled in the first desulfurizer 100 is calculated by dividing a weight of sulfur included in the source gas, by the weight of sulfur adsorbed from the source gas by the normal-temperature desulfurizing agent. The weight of sulfur included in the source gas is calculated from a weight of the sulfur compounds included in the source gas. As described above, the weight percentage of sulfur adsorbed from the source gas by the normal-temperature desulfurizing agent relative to the weight of the normal-temperature desulfurizing agent corresponds to the sulfur adsorption capacity of the normal-temperature desulfurizing agent. The sulfur adsorption capacity of the normal-temperature desulfurizing agent is determined by the operating temperature of the first desulfurizer 100 and by the dew point of the source gas. Furthermore, according to the first embodiment, the first desulfurizer 100 may desulfurize the source gas and may heat the source gas in advance.

Second Embodiment

FIG. 2A illustrates the desulfurization unit according to a second embodiment of the disclosure. A configuration and effects of the desulfurization unit of the second embodiment are similar to those of the first embodiment. As illustrated in FIG. 2A, the first desulfurizer 100 accommodating the normal-temperature desulfurizing agent having zeolite is set in the temperature environment ranging from 50° C. to 200° C. The normal-temperature desulfurizing agent having zeolite appropriately exerts the desulfurization effect in the normal temperature range from 0° C. to 50° C. (exclusive of 50° C.). In particular, the first desulfurizer 100 is arranged next to the heat source 410 in the fuel cell system 400 so as to receive the heat from the heat source 410, thereby being heated to the temperature environment ranging from 50° C. to 200° C. As illustrated in FIG. 2A, the desulfurization unit according to the second embodiment includes the first desulfurizer 100 and a second desulfurizer 200 that is used at normal temperature. The second desulfurizer 200 is set in the normal temperature environment that is lower than 50° C. The second desulfurizer 200 accommodates the normal-temperature desulfurizing agent including a porous material serving as a base material. The porous material, for example, including zeolite or metal-carrying zeolite where the metal is transition metal or the like, exerts a desulfurization effect under the normal temperature range from 0° C. to 50° C. (exclusive of 50° C.).

The normal-temperature desulfurizing agent of the second desulfurizer 200 may not have a specific shape and a specific size. For example, the normal-temperature desulfurizing agent of the second desulfurizer 200 may be formed of grains each having a diameter of 1 millimeter to 2 millimeters. Further, the normal-temperature desulfurizing agent of the second desulfurizer 200 may be formed of cylinder solids each having a circular cross-section perpendicular to a longitudinal direction of the cylinder solid. The circular cross-section has a diameter of 1 millimeter to 2 millimeters. Furthermore, the normal-temperature desulfurizing agent of the second desulfurizer 200 may be formed in a different form from the grains or the cylindrical solids.

A lower limit of the normal temperature range may be either one of $0°$ C., $10°$ C., and $20°$ C. in consideration for that the second desulfurizer 200 is set in a case of the fuel cell 400 (the lower limit needs to be set in consideration for that water to be used for the reformer may freeze in winter). As illustrated in FIG. 2A, the second desulfurizer 200 includes an inlet port 200$i$ and an outlet port 200$p$. The first desulfurizer 100 and the second desulfurizer 200 are arranged in series with each other. The second desulfurizer 200 used at normal temperature is positioned at an upstream side in a flow direction of the source gas relative to the first desulfurizer 100 used at high temperature.

According to the second embodiment, in a case where the source gas having the low dew point and including the small volume of water vapor is desulfurized by the desulfurization unit and in a case where the source gas having the high dew point and including the large volume of water vapor is desulfurized by the desulfurization unit, the sulfur compounds of the source gas may be appropriately removed therefrom by the normal-temperature desulfurizing agent accommodated in the first desulfurizer 100 and being insusceptible to the water vapor. For example, even in a case where the dew point of the source gas varies when a gas fitting work or a gas-pipe laying work is performed, the first desulfurizer 100 set at high temperature for accommodating the normal-temperature desulfurizing agent that is insusceptible to the water vapor may appropriately remove the sulfur compounds from the source gas. In addition, according to the second embodiment, in a case where the source gas having the high dew point is supplied to the desulfurization unit, the normal-temperature desulfurizing agent of the second desulfurizer 200 used at normal temperature is damaged by the water vapor. Therefore, a life-span of the normal-temperature desulfurizing agent of the second desulfurizer 200 may be shortened. Even in such case, the sulfur compounds of the source gas having the high dew point may be appropriately removed from the source gas by the normal-temperature desulfurizing agent accommodated in the first desulfurizer 100 used at high temperature. It is appropriate for the second desulfurizer 200 to be replaced by the new second desulfurizer 200 at the time of maintenance.

Moreover, the source gas generally has the low dew point (for example, at $0°$ C. or lower and at $-10°$ C. or lower). The volume of the water vapor included in the source gas is small. The sulfur compounds of the source gas having the low dew point may be appropriately removed from the source gas by the normal-temperature desulfurizing agent including zeolite and being accommodated in the second desulfurizer 200. In such case, the source gas is desulfurized by the second desulfurizer 200 used at normal temperature, thereafter passing through the first desulfurizer 100 used at high temperature. At this time, an amount of the sulfur compounds removed from the source gas by the first desulfurizer 100 decreases; therefore, the life-span of the normal-temperature desulfurizing agent of the first desulfurizer 100 may be refrained from shortening.

The volume of the water vapor included in the source gas increases less frequently; however, the volume of the water vapor may increase when a gas fitting work or a gas-pipe laying work is performed. As a result, the dew point of the source gas may increase. In such case, the desulfurization effect of the normal-temperature desulfurizing agent accommodated in the second desulfurizer 200 set in the normal temperature environment may decrease because of the water vapor. However, the normal-temperature desulfurizing agent including the porous base material and being accommodated in the first desulfurizer 100 set in the high temperature environment may appropriately exert the desulfurization effect. Consequently, the desulfurization unit according to the second embodiment may appropriately remove the sulfur compounds from the source gas having the high dew point. Thus, according to the desulfurization unit of the second embodiment, the source gas is appropriately desulfurized by both the first desulfurizer 100 used at high temperature and the second desulfurizer 200 used at normal temperature.

In the case where the source gas generally has the low dew point as described above, the source gas is appropriately desulfurized by the second desulfurizer 200 used at normal temperature. Even in a case where the desulfurization effect of the normal-temperature desulfurizing agent accommodated in the second desulfurizer 200 decreases, the source gas is surely supplied from the second desulfurizer 200 to the first desulfurizer 100 used at high temperature. Therefore, according to the second embodiment, the source gas may be effectively desulfurized by the desulfurization unit regardless of the dew point of the source gas.

Figure 2B:
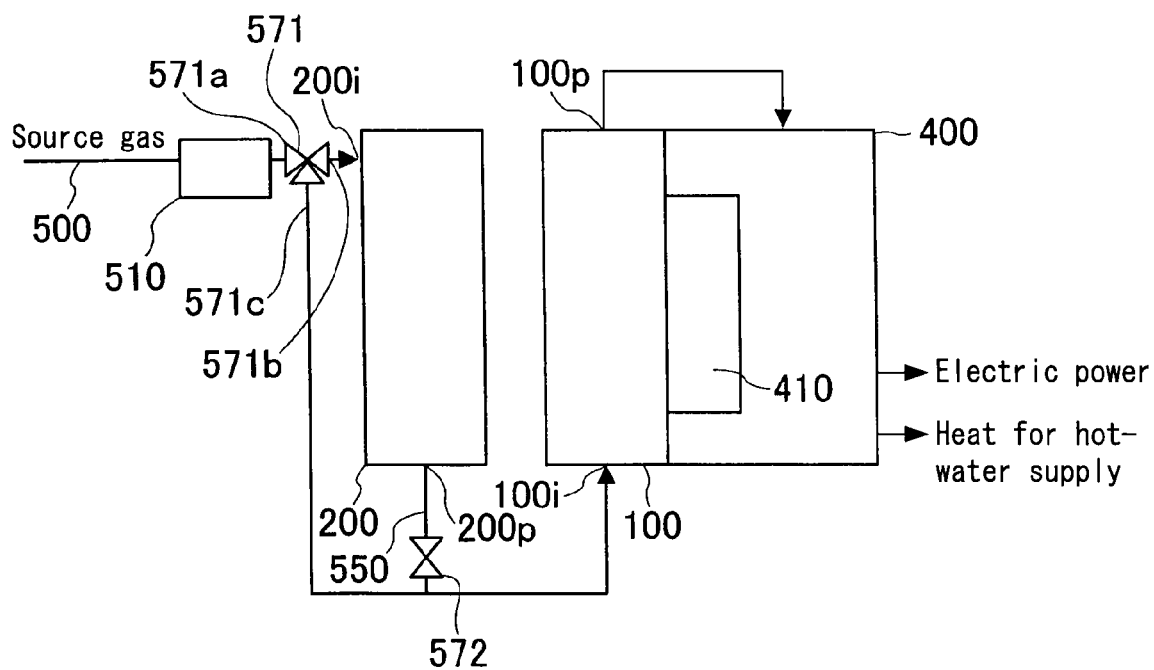
FIG. 2B is a conceptual figure illustrating the desulfurization unit arranged at the fuel cell system according to a modified example of the second embodiment.

FIG. 2B illustrates a modified example of the second embodiment. As illustrated in FIG. 2B, a three-way valve 571 may be arranged between the dew-point meter 510 and the inlet port 200$i$ of the second desulfurizer 200 and a valve 572 may be arranged at a passage 550 separated from the source gas passage 500 and led out from the outlet port 200$p$ of the second desulfurizer 200. According to the modified example of the second embodiment, in a case where the source gas having the low dew point and including the small volume of water vapor is supplied to the desulfurization unit, ports 571$a$ and 571$b$ of the three-way valve 571 are opened and a port 571$c$ of the three-way valve 571 is closed. Therefore, the source gas having the low dew point is supplied from the gas source through the source gas passage 500, the dew-point meter 510, and the second desulfurizer 200 to the first desulfurizer 100. On the other hand, according to the modified example of the second embodiment, in a case where the source gas having the high dew point and including the large volume of water vapor is supplied to the desulfurization unit, the ports 571$a$ and 571$c$ of the three-way valve 571 are opened and the port 571$b$ of the three-way valve 571 is closed. Therefore, the source gas having the high dew point is supplied from the gas source through the source gas passage 500 and the dew-point meter 510 to the first desulfurizer 100. At this time, the source gas having the high dew point is not allowed to pass through the second desulfurizer 200, thereby protecting the second desulfurizer 200 from the water vapor included in the source gas.

Third Embodiment

Figure 3:
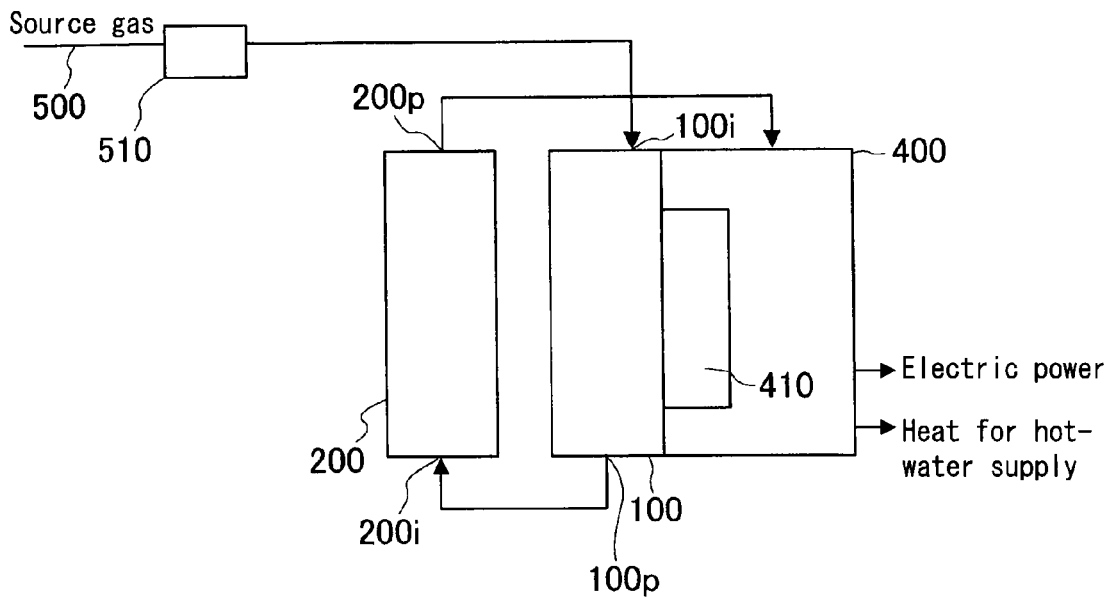
FIG. 3 is a conceptual figure illustrating the desulfurization unit arranged at the fuel cell system according to a third embodiment of the disclosure.

FIG. 3 illustrates the desulfurization unit according to a third embodiment of the disclosure. A configuration and effects of the desulfurization unit of the third embodiment are similar to those of the first embodiment. The desulfurization unit of the third embodiment includes the first desulfurizer 100 accommodating the normal-temperature desulfurizing agent including the porous base material having zeolite. The normal-temperature desulfurizing agent having zeolite appropriately exerts the desulfurization effect in the normal temperature range from 0° C. to 50° C. (exclusive of 50° C.). The first desulfurizer 100 is set in the temperature environment ranging from 50° C. to 200° C. In particular, the first desulfurizer 100 is arranged next to the heat source 410 in the fuel cell system 400 so as to receive the heat from the heat source 410. Therefore, the normal-temperature desulfurizing agent accommodated in the first desulfurizer 100 is heated, for example, by thermal conduction or by thermal radiation due to the heat transmitted from the heat source 410, thereby being heated to the temperature environment ranging from 50° C. to 200° C.

Further, as illustrated in FIG. 3, the desulfurization unit according to the third embodiment includes the second desulfurizer 200 used at normal temperature. The second desulfurizer 200 accommodates the normal-temperature desulfurizing agent including zeolite, metal-carrying zeolite where the metal is, for example, transition metal. The second desulfurizer 200 is set in a temperature environment, for example, the normal temperature range from 0° C. to 50° C. (exclusive of 50° C.). As illustrated in FIG. 3, the first desulfurizer 100 and the second desulfurizer 200 are arranged in series with each other. The first desulfurizer 100 used at high temperature is positioned at the upstream side in the flow direction of the source gas relative to the second desulfurizer 200 used at normal temperature.

According to the third embodiment, in a case where the source gas having the low dew point and including the small volume of water vapor is desulfurized by the desulfurization unit and in a case where the source gas having the high dew point and including the large volume of water vapor is desulfurized by the desulfurization unit, the sulfur compounds of the source gas may be appropriately removed therefrom by the normal-temperature desulfurizing agent of the first desulfurizer 100 set in the high temperature environment. For example, even in a case where the dew point of the source gas varies due to a gas fitting work or a gas-pipe laying work to therefore vary the volume of the water vapor included in the source gas, the first desulfurizer 100 accommodating the normal-temperature desulfurizing agent may appropriately desulfurize the source gas. In addition, according to the third embodiment, in a case where the source gas having the high dew point is supplied to the desulfurization unit, the second desulfurizer 200 used at normal temperature is susceptible to the water vapor. Therefore, the life-span of the normal-temperature desulfurizing agent of the second desulfurizer 200 may be shortened. Even in such case, the sulfur compounds of the source gas having the high dew point may be appropriately removed from the source gas by the normal-temperature desulfurizing agent accommodated in the first desulfurizer 100 and being insusceptible to the water vapor. In addition, it is appropriate for the second desulfurizer 200 to be replaced by the new second desulfurizer 200 at the time of maintenance.

As seen from FIG. 3, according to the third embodiment, in a case where the source gas having the high dew point is supplied to the desulfurization unit, the source gas is preferentially desulfurized by the normal-temperature desulfurizing agent accommodated in the first desulfurizer 100 set at high temperature. As a result, the sulfur compounds included in the source gas are appropriately decreased. Therefore, even when the normal-temperature desulfurizing agent accommodated in the second desulfurizer 200 used at normal temperature does not sufficiently exert the desulfurization effect, the function of the fuel cell system 400 is not specially affected by the deficiency of the desulfurization effect of the normal-temperature desulfurizing agent of the second desulfurizer 200. In addition, the normal-temperature desulfurizing agent accommodated in the second desulfurizer 200 is arranged at a downstream side in the flow direction of the source gas relative to the normal-temperature desulfurizing agent accommodated in the first desulfurizer 100. The normal-temperature desulfurizing agent of the second desulfurizer 200 is relatively susceptible to the water vapor compared to the normal-temperature desulfurizing agent of the first desulfurizer 100. Accordingly, a certain amount of the water vapor included in the source gas is reduced by the normal-temperature desulfurizing agent accommodated in the first desulfurizer 100. Consequently, the influence of the water vapor on the desulfurizing agent accommodated in the second desulfurizer 200 and being susceptible to the water vapor compared to the normal-temperature desulfurizing agent of the first desulfurizer 100 may be minimized.

Fourth Embodiment

Figure 4:
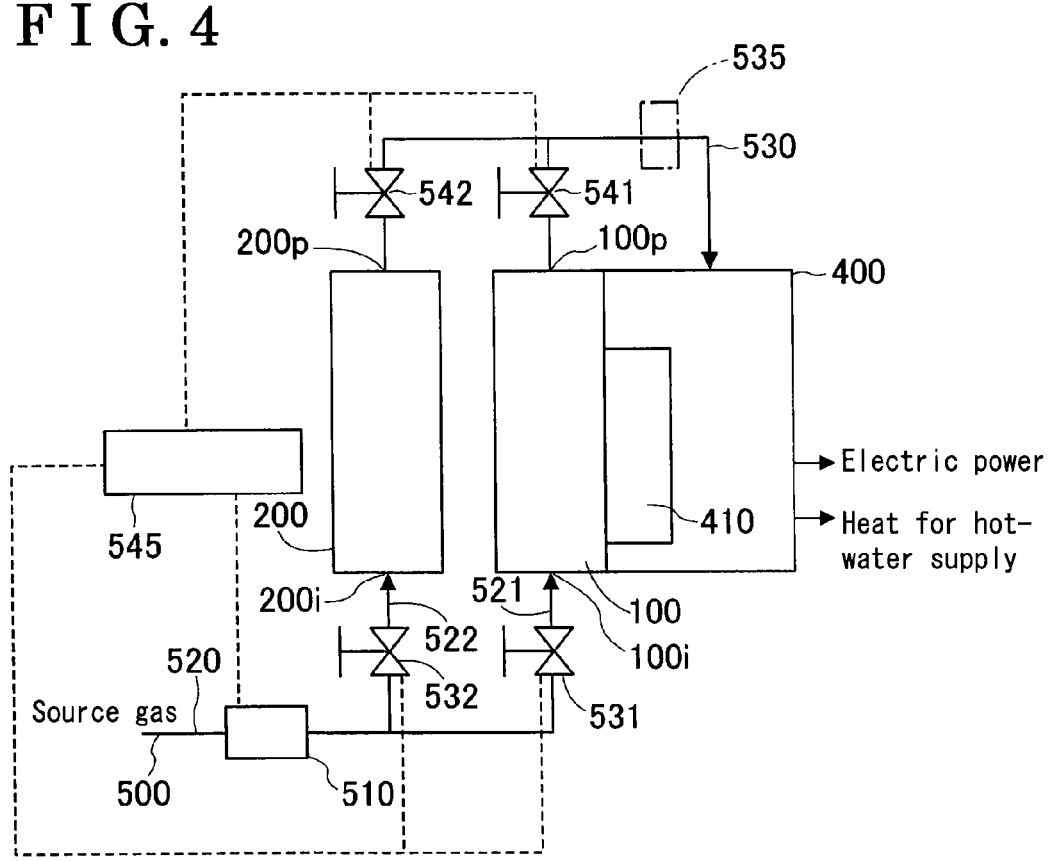
FIG. 4 is a conceptual figure illustrating the desulfurization unit arranged at the fuel cell system according to a fourth embodiment of the disclosure.

FIG. 4 illustrates the desulfurization unit according to a fourth embodiment of the disclosure. A configuration and effects of the desulfurization unit of the fourth embodiment are similar to those of the first embodiment. As illustrated in FIG. 4, the first desulfurizer 100 accommodating the normal-temperature desulfurizing agent including the porous base material having zeolite is set in the temperature environment ranging from 50° C. to 200° C. In particular, the first desulfurizer 100 is arranged next to the heat source 410 in the fuel cell system 400 so as to receive the heat from the heat source 410. Therefore, the normal-temperature desulfurizing agent accommodated in the first desulfurizer 100 is heated, for example, by thermal conduction or by thermal radiation due to the heat transmitted from the heat source 410, thereby being heated to the temperature environment ranging from 50° C. to 200° C.

As illustrated in FIG. 4, according to the desulfurization unit of the fourth embodiment, the source gas passage 500 includes a first common passage 520, first and second parallel passages 521 and 522 arranged parallel with each other, and a second common passage 530 connecting to the reformer of the fuel cell system 400. The first common passage 520 is positioned at the upstream side of the second common passage 530 in the flow direction of the source gas in a state where the dew-point meter 510 is positioned at the upstream side in the flow direction of the source gas. The first parallel passage 521 is arranged so as to connect to the first desulfurizer 100. The second parallel passage 522 is arranged in the normal temperature environment (lower than 50° C.) so as to connect to the second desulfurizer 200 accommodating the normal-temperature desulfurizing agent including the porous base material. Thus, the first and second parallel passages 521 and 522 are arranged in parallel with each other.

As illustrated in FIG. 4, a first inlet port valve 531 is arranged at the inlet port 100$i$ of the first desulfurizer 100 while a first outlet port valve 541 is arranged at the outlet port 100$p$ of the first desulfurizer 100. A second inlet port valve 532 is arranged at the inlet port 200$i$ of the second desulfurizer 200 while a second outlet port valve 542 is arranged at the outlet port 200$p$ of the second desulfurizer 200. A detection signal of the dew-point meter 510 is inputted to a control portion 545. The control portion 545 controls opening and closing operations of the first inlet port valve 531, the first outlet port valve 541, the second inlet port valve 532, and the second outlet port valve 542. In other words, according to the fourth embodiment, in a case where the source gas including the small volume of water vapor and having the low dew point lower than a threshold temperature is desulfurized by the desulfurization unit, the second inlet port valve 532 and the second outlet port valve 542 of the second desulfurizer 200 used at normal temperature, are controlled by the control portion 545 so as to be opened. In addition, the first inlet port valve 531 and the first outlet port valve 541 of the first desulfurizer 100 used at high temperature, are controlled by the control portion 545 so as to be closed. In such case, the source gas having the low dew point is desulfurized by the normal-temperature desulfurizing agent of the second desulfurizer 200.

On the other hand, according to the fourth embodiment, in a case where the source gas including the large volume of water vapor and having the high dew point equal to or higher than the threshold temperature is desulfurized by the desulfurization unit, the first inlet port valve 531 and the first outlet port valve 541 of the first desulfurizer 100 are controlled by the control portion 545 so as to be opened. In addition, the second inlet port valve 532 and the second outlet port valve 542 of the second desulfurizer 200 are controlled by the control portion 545 so as to be closed. In addition, the normal-temperature desulfurizing agent of the second desulfurizer 200 is relatively susceptible to the water vapor compared to the normal-temperature desulfurizing agent of the first desulfurizer 100. Thus, the source gas having the high dew point and including the large volume of water vapor is refrained from flowing in the second desulfurizer 200 used at normal temperature and the source gas having the high dew point is desulfurized by the first desulfurizer 100 used at high temperature. Accordingly, the normal-temperature desulfurizing agent accommodated in the second desulfurizer 200 is refrained from being damaged by the water vapor included in the source gas having the high dew point. Consequently, the life-span of the normal-temperature desulfurizing agent accommodated in the second desulfurizer 200 and being relatively susceptible to the water vapor compared to the normal-temperature desulfurizing agent of the first desulfurizer 100 may be refrained from shortening. In addition, as illustrated in FIG. 4, according to the desulfurization unit of the fourth embodiment, a buffer 535 including a hollow chamber may be arranged at the downstream side of the first outlet port valve 541 and the second outlet port valve 542 in the flow direction of the source gas. The buffer 535 functions to temporarily buffer the source gas in the hollow chamber, for example, in a case where a flow rate of the source gas varies to be increased when the first inlet port valve 531, the first outlet port valve 541, the second inlet port valve 532, and the second outlet port valve 542 are switched between the opened and closed states. Moreover, the source gas having the low dew point tends to be frequently utilized compared to the source gas having the high dew point; therefore, the first desulfurizer 100 is less frequently used compared to the second desulfurizer 200. Accordingly, in a case where the desulfurization effect of the normal-temperature desulfurizing agent of the second desulfurizer 200 decreases, the first inlet port valve 531, the first outlet port valve 541, the second inlet port valve 532, and the second outlet port valve 542 may be switched between the opened and closed states so that the source gas consistently flows into the first desulfurizer 100.

Fifth Embodiment

Figure 5:
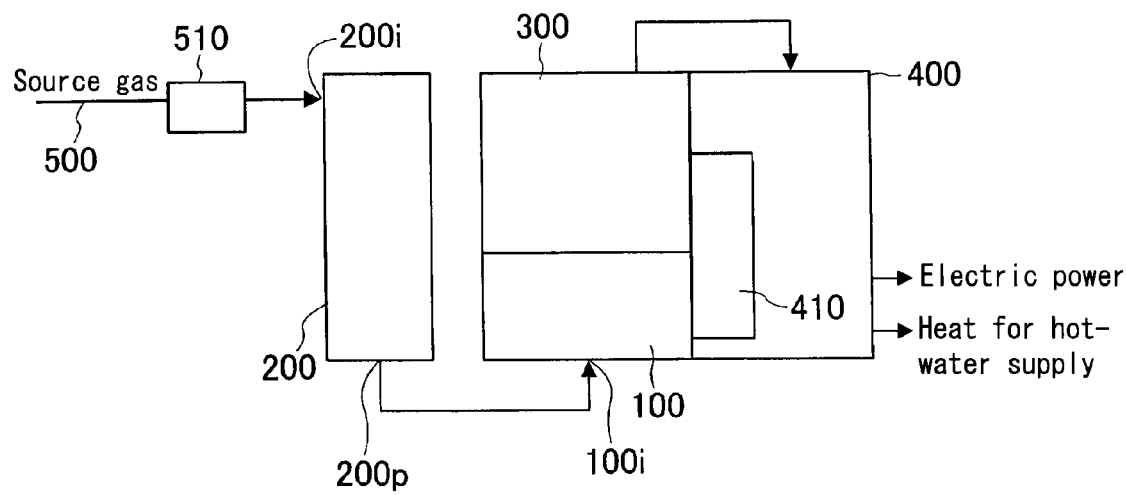
FIG. 5 is a conceptual figure illustrating the desulfurization unit arranged at the fuel cell system according to a fifth embodiment of the disclosure.

FIG. 5 illustrates the desulfurization unit according to a fifth embodiment of the disclosure. A configuration and effects of the desulfurization unit of the fifth embodiment are similar to those of the first embodiment. In the fifth embodiment, the source gas is LPG. The first desulfurizer 100 accommodating the normal-temperature desulfurizing agent including the porous base material having zeolite is set in the temperature environment ranging from 50° C. to 200° C. In particular, the first desulfurizer 100 and a third desulfurizer 300 that will be described below are provided so as to receive the heat from the heat source 410. The normal-temperature desulfurizing agent accommodated in the first desulfurizer 100 is heated by the heat transmitted from the heat source 410. Therefore, the normal-temperature desulfurizing agent accommodated in the first desulfurizer 100 is heated, for example, by thermal conduction or by thermal radiation due to the heat transmitted from the heat source 410.

As illustrated in FIG. 5, the second desulfurizer 200 used at normal temperature for accommodating the normal-temperature desulfurizing agent including the porous base material having zeolite is set in the normal temperature environment raging from 0° C. to 50° C. (exclusive of 50° C.). The first desulfurizer 100 and the second desulfurizer 200 are arranged in series with each other. As illustrated in FIG. 5, the second desulfurizer 200 used at normal temperature is positioned at the upstream side in the flow direction of the source gas relative to the first desulfurizer 100 used at high temperature. In addition, the third desulfurizer 300 is set in the high temperature environment raging from 50° C. to 200° C. The third desulfurizer 300 accommodates a desulfurizing agent for adsorbing sulfur compounds specifically included in LPG (the desulfurizing agent will be referred to as an LPG desulfurizing agent). A material of LPG desulfurizing agent is, for example, nickel-carrying metal oxide. In particular, the LPG desulfurizing agent adsorbs the sulfur compounds included in LPG. The sulfur compounds of LPG are, for example, hydrogen sulfide ($H_2S$), carbon disulfide ($CS_2$), carbonyl sulfide (COS), and the like. As illustrated in FIG. 5, the second desulfurizer 200 used at normal temperature, the first desulfurizer 100 used at high temperature, and the third desulfurizer 300 for LPG are arranged in series with one another in the mentioned order from the upstream side to the downstream side in the flow direction of the source gas. Accordingly, the source gas is desulfurized by the second desulfurizer 200 and the first desulfurizer 100 and is thereafter supplied to the third desulfurizer 300. Consequently, a life-span of the third desulfurizer 300 may be refrained from shortening.

Sixth Embodiment

Figure 6:
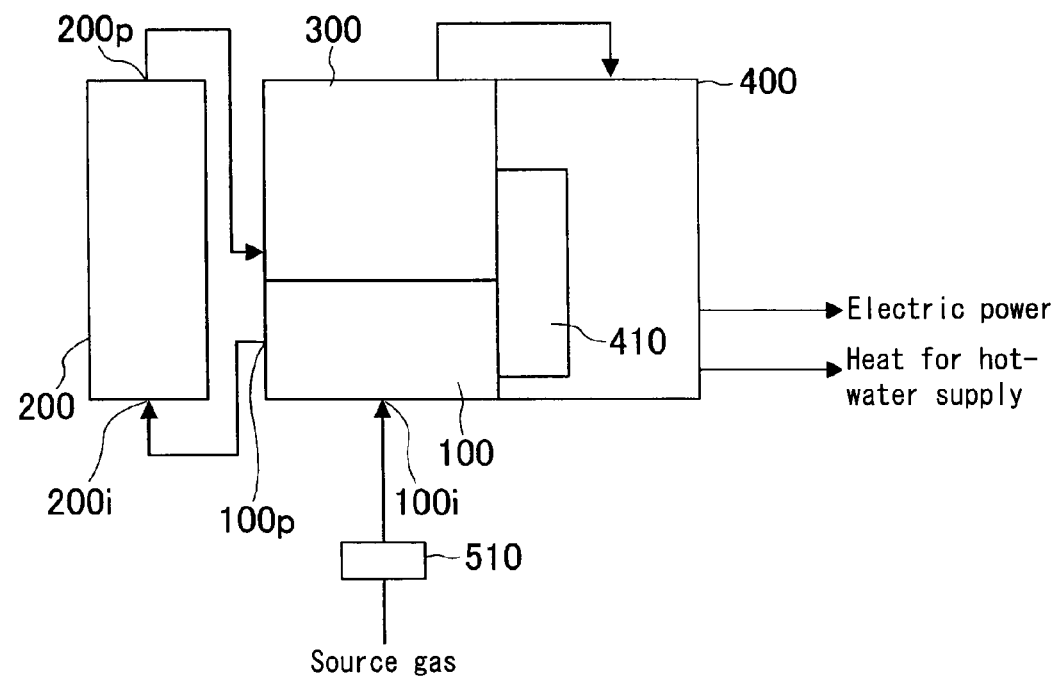
FIG. 6 is a conceptual figure illustrating the desulfurization unit arranged at the fuel cell system according to a sixth embodiment of the disclosure.

FIG. 6 illustrates the desulfurization unit according to a sixth embodiment of the disclosure. A configuration and effects of the desulfurization unit of the sixths embodiment are similar to those of the fifth embodiment. In the sixth embodiment, the source gas is LPG. The first desulfurizer 100 accommodating the normal-temperature desulfurizing agent including the porous base material having zeolite, and the third desulfurizer 300 accommodating LPG desulfurizing agent are set in the high temperature environment ranging from 50° C. to 200° C. The second desulfurizer 200 used at normal temperature for accommodating the normal-temperature desulfurizing agent including zeolite is set in the normal temperature environment that is lower than 50° C. Further, as illustrated in FIG. 6, the first desulfurizer 100 used at high temperature, the second desulfurizer 200 used at normal temperature, and the third desulfurizer 300 for LPG are arranged in series with one another in the mentioned order from the upstream side to the downstream side in the flow direction of the source gas. Accordingly, the source gas is desulfurized by the first desulfurizer 100 and the second desulfurizer 200 and is thereafter supplied to the third desulfurizer 300. Consequently, the life-span of the third desulfurizer 300 may be refrained from shortening.

The source gas generally has the low dew point (for example, 0° C. or lower, −10° C. or lower). The volume of the water vapor included in the source gas is small. The volume of the water vapor included in the source gas increases less frequently; however, the volume of the water vapor included in the source gas may increase when a gas fitting work or a gas-pipe laying work is performed. As a result, the dew point of the source gas may increase. As seen from FIG. 6, in a case where the source gas having the high dew point is supplied to the desulfurization unit of the sixth embodiment, the source gas is preferentially desulfurized by the normal-temperature desulfurizing agent accommodated in the first desulfurizer 100 used in the high temperature environment. Accordingly, the sulfur compounds of the source gas appropriately decrease. Consequently, even in a case where the normal-temperature desulfurizing agent of the second desulfurizer 200 used at normal temperature does not sufficiently exert the desulfurization effect because of the water vapor included in the source gas, the function of the fuel cell system 400 is not specially affected by the deficiency of the desulfurization effect of the normal-temperature desulfurizing agent of the second desulfurizer 200.

In addition, according to the sixth embodiment, as illustrated in FIG. 6, the second desulfurizer 200 including is positioned at the downstream side in the flow direction of the source gas relative to the first desulfurizer 100. In addition, the normal-temperature desulfurizing agent of the second desulfurizer 200 is relatively susceptible to the water vapor compared to the normal-temperature desulfurizing agent of the first desulfurizer 100. Thus, a certain amount of the water vapor included in the source gas is reduced by the normal-temperature desulfurizing agent including the porous base material and being accommodated in the first desulfurizer 100. Consequently, the influence of the water vapor of the source gas on the normal-temperature desulfurizing agent accommodated in the second desulfurizer 200 and being relatively susceptible to the water vapor compared to the normal-temperature desulfurizing agent of the first desulfurizer 100 may be minimized. As a result, the life-span of the normal-temperature desulfurizing agent of the second desulfurizer 200 may be refrained from shortening.

Figure 7:
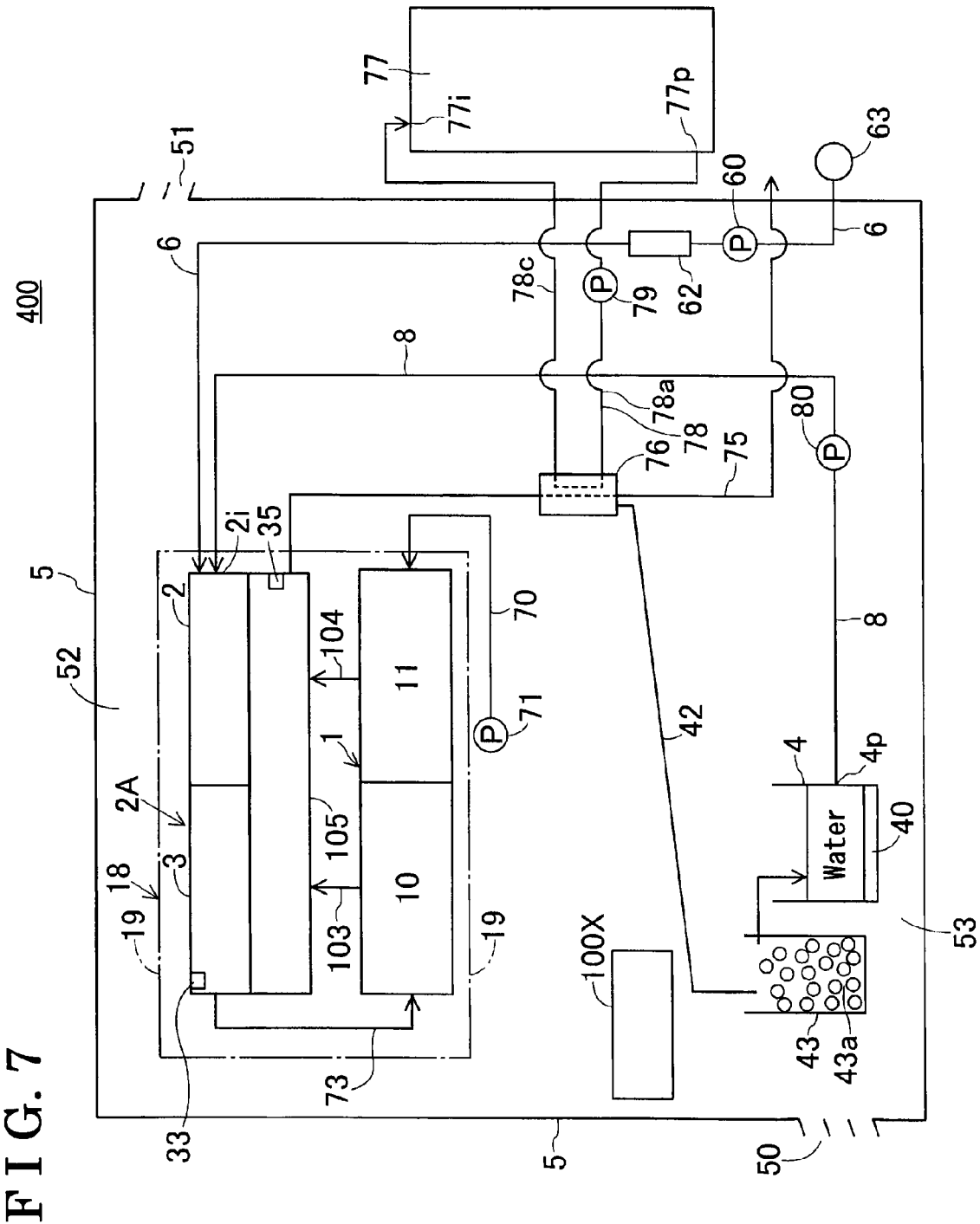
FIG. 7 illustrates a layout of fuel cell system according to an example of the application of the aforementioned embodiments disclosed here.

An example of the application of the fuel cell system 400 according to the aforementioned embodiments will be explained with reference to FIG. 7. As illustrated in FIG. 7, the fuel cell system 400 includes a water purification device 43 and the desulfurization unit that is described in the aforementioned embodiments. The fuel cell system 400 includes a fuel cell 1, an evaporating portion 2, a reforming portion 3, a combusting portion 105, a tank 4, and a case 5. The evaporating portion 2 evaporates water in a liquid-phase to thereby generate water vapor. The reforming portion 3 reforms a fuel (the source gas) by means of the water vapor generated by the evaporating portion 2 to thereby generate an anode gas. The combusting portion 105 heats the evaporating portion 2 and the reforming portion 3. The tank 4 stores therein the water in a liquid-phase. The water of the tank 4 is supplied to the evaporating portion 2. The case 5 accommodates the fuel cell 1, the evaporating portion 2, the reforming portion 3, the combusting portion 105, and the tank 4. The fuel cell 1 includes an anode 10 and a cathode 11 sandwiching an ion conductor therebetween. A solid oxide fuel cell (for example, operating at 400° C. or higher) may be applied as the fuel cell 1 (the solid oxide fuel cell will be abbreviated to SOFC). The anode gas emitted from the anode 10 is supplied through an anode gas exhaust passage 103 to the combusting portion 105. A cathode gas emitted from the cathode 11 is supplied through a cathode gas exhaust passage 104 to the combusting portion 105. The combusting portion 105 combusts the anode gas and the cathode gas to thereby heat the evaporating portion 2 and the reforming portion 3. A combustion gas exhaust passage 75 is arranged at the combusting portion 105. The anode gas and the cathode gas that are combusted by the combusting portion 105 (the anode gas and the cathode gas that are combusted by the combusting portion 105 will be referred to as a combustion gas), and the combustion gas including the anode gas and the cathode gas that are not combusted by the combusting portion 105, are discharged from the combusting portion 105 through the combustion gas exhaust passage 75 to an outer side of the case 5. The reforming portion 3 is formed by a carrier such as ceramics on which a reforming catalyst is carried. The reforming portion 3 is arranged next to the evaporating portion 2. The reforming portion 3 and the evaporating portion 2 forming a reformer 2A are covered by an insulated wall 19, thereby configuring a power generation module 18. A temperature sensor 33 detecting a temperature of the reforming portion 3 is arranged within the reforming portion 3. An ignition portion 35 igniting the fuel (source gas) is arranged within the combusting portion 105. Any member may be applied as the ignition portion 35 as long as the member ignites the fuel. A signal of the temperature sensor 33 is inputted to a control portion 100X. When the fuel cell system 400 is in operation to generate electric power, the reformer 2A is heated inside the insulated wall 19 so as to be suitable for a steam-reforming reaction. When the fuel cell system 400 is in operation to generate electric power, the evaporating portion 2 heats the water to thereby generate the water vapor. In a case where the fuel cell 1 is formed by the SOFC, the anode gas and the cathode gas emitted from the anode 10 and the cathode 11, respectively are combusted by the combusting portion 105. Therefore, the reforming portion 3 and the evaporating portion 2 are simultaneously heated within the power generation module 18. The source gas supplied from a gas source 63 is supplied through a source gas passage 6 to the reformer 2A. The source gas passage 6 includes a fuel pump 60 and a first desulfurizer 62.

FIG. 7 illustrates a layout of the fuel cell system 400 according to the aforementioned example. The first desulfurizer 62 accommodates the normal-temperature desulfurizing agent including the porous base material having zeolite. The first desulfurizer 62 is provided thermally in contact with the insulated wall 19 of the power generation module 18 (serving as the heat source). When the fuel cell system 400 is in operation, the first desulfurizer 62 receives heat from the insulated wall 19 of the power generation module 18, thereby being heated to the high temperature range ranging from 50° C. to 200° C. A cathode gas passage 70 is connected to the cathode 11 of the fuel cell 1. The cathode gas is supplied from a cathode pump 71 through the cathode gas passage 70 to the cathode 11. The cathode pump 71 functioning as a cathode gas source is arranged at the cathode gas passage 70.

As illustrated in FIG. 7, the case 5 includes intake and exhaust ports 50 and 51 connecting to outside air (the outer side of the case 5). The case 5 further includes upper and lower chambers 52 and 53 serving as first and second chambers, respectively. The fuel cell 1, the evaporating portion 2, the reforming portion 3, and the combusting portion 105 are accommodated in the upper chamber 52 of the case 5 so as to be located at an upper side of the case 5. The tank 4 storing the water to be reformed by the reforming portion 3 is accommodated in the lower chamber 53 of the case 5. A heating portion 40 such as an electric heater having a heating function is arranged at the tank 4. The heating portion 40 formed by the electric heater heats the water stored in the tank 4. For example, in a case where an environmental temperature (for example, an outside air temperature) of the fuel cell system 400 is low, the water in the tank 4 is heated by the heating portion 40 to a predetermined temperature or higher (for example, 5° C., 10° C., 20° C.) in accordance with a command from the control portion 100X. Therefore, the fuel cell system 400 is refrained from freezing. As illustrated in FIG. 7, a water supply passage 8 serving as a pipe is arranged in the case 5. The water supply passage 8 connects an outlet port 4p of the tank 4 in the lower chamber 53 to an inlet port 21 of the evaporating portion 2 in the upper chamber 52. Further, as illustrated in FIG. 7, the tank 4 is arranged at a lower side of the evaporating portion 2 within the case 5; therefore, the water supply passage 8 extends substantially vertically.

The water supply passage 8 is a passage through which the water stored in the tank 4 is supplied to the evaporating portion 2. A water supply pump 80 functioning as a water supply source for supplying the water from the tank 4 to the evaporating portion 2 is arranged at the water supply passage 8. The control portion 100X controlling an operation of the water supply pump 80 is provided at the fuel cell system 400. The control portion 100X further controls operations of the cathode pump 71, the fuel pump 60, and a hot-water supply pump 79. When the fuel cell system 400 is in operation, the water supply pump 80 is driven. Therefore, the water stored in the tank 4 is supplied therefrom through the outlet port 4p of the tank 4, thereafter passing through the water supply passage 8 to the inlet port 21 of the evaporating portion 2. Then, the water supplied to the evaporating portion 2 is heated therein, therefore generating the water vapor. The water vapor generated by the evaporating portion 2 and the source gas supplied from the fuel pump 60 through the source gas passage 6 to the evaporating portion 2 are transferred to the reinforcing portion 3. The source gas transferred to the reforming portion 3 is reformed therein by the water vapor, thereby generating the anode gas (hydrogen-containing gas). In addition, in a case where the fuel (source gas) is a methane gas, the methane gas is reformed in the reforming portion 3 by the water vapor, thereby generating the anode gas as in the following formula (1).

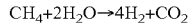

  (1)

The source gas is not limited to the methane gas and a gas different from the source gas is applicable. The anode gas generated on the basis of the formula (1) is supplied from the reinforcing portion 3 through an anode gas passage 73 to the anode 10 of the fuel cell 1. Further, the cathode gas (oxygen-containing gas, air within the case 5) is supplied from the cathode pump 71 through the cathode gas passage 70 to the cathode 11 of the fuel cell 1. As a result, the fuel cell 1 generates electric power. The combustion gas (hot exhaust gas) emitted from the combusting portion 105 of the power generation module 18 is discharged through the combustion gas exhaust passage 75 to the outer side of the case 5.

A heat exchanger 76 having a function to condense the water is arranged at the combustion gas exhaust passage 75. A hot-water passage 78 is connected to the heat exchanger 76 and the hot-water supply pump 79 connecting to a hot-water chamber 77 is arranged at the hot-water passage 78. The hot-water passage 78 includes an outward passage 78a and a return passage 78c. The hot-water supply pump 79 is driven; therefore, low-temperature water in the hot-water chamber 77 is discharged therefrom through a discharge port 77p of the hot-water chamber 77 and thereafter passes through the outward passage 78a to the heat exchanger 76. Afterward, the low-temperature water supplied from the hot-water chamber 77 to the heat exchanger 76 is heated, thereby generating the hot water. Afterward, the hot water discharged from the heat exchanger 76 is returned through the return passage 78c and thereafter passes through a return port 77i of the hot-water chamber 77 to the hot-water chamber 77. As described above, the low-temperature water of the hot-water chamber 77 is changed to the hot water. The water vapor included in the combustion gas emitted from the combusting portion 105 is condensed by the heat exchanger 76; thereby, the condensed water is generated. The condensed water is supplied, for example, by gravity from the heat exchanger 76 through a condensed water passage 42 to the water purification device 43. The condensed water passage 42 extends from the heat exchanger 76 to the water purification device 43. The water purification device 43 includes a water purification portion 43a made of ion-exchange resin or the like, thereby removing impurities of the condensed water therefrom. The purified water is moved to the tank 4 and is stored therein. When the water supply pump 80 is driven, the water in the tank 4 is supplied therefrom through the water supply passage 8 to the evaporating portion 2 heated by the combusting portion 105, thereby turning into the water vapor. The water vapor is supplied to the reforming portion 3 and is therefore utilized to reform the fuel.

Seventh Embodiment

Figure 8:
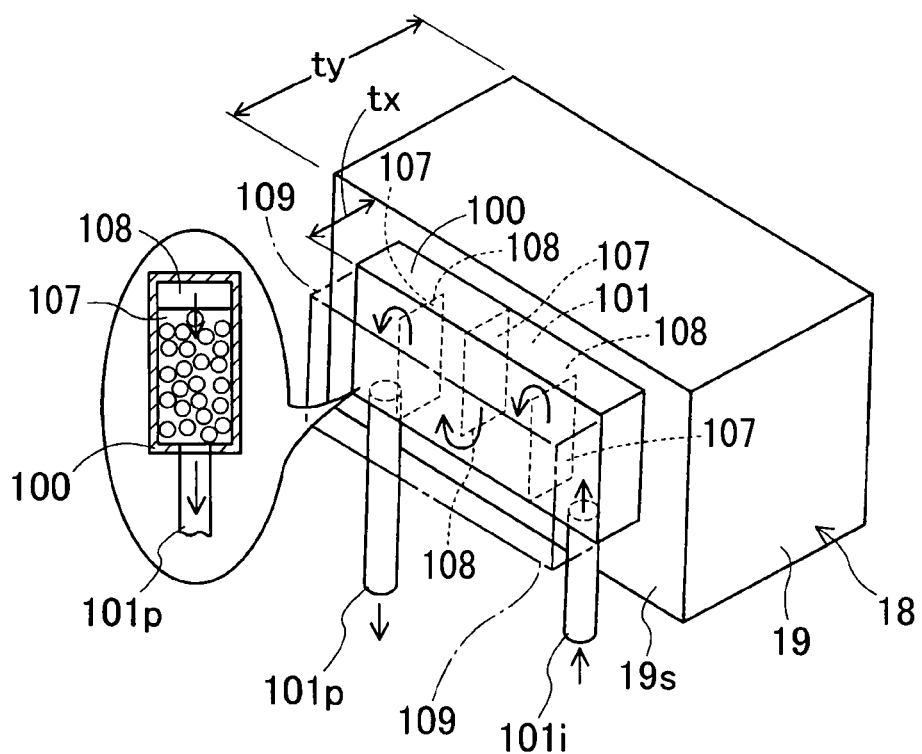
FIG. 8 is a perspective view illustrating the desulfurization unit arranged at a power generation module according to a seventh embodiment of the disclosure.

FIG. 8 illustrates the first desulfurizer 100 arranged at the power generation module 18 according to a seventh embodiment of the disclosure. The first desulfurizer 100 used at high temperature is attached thermally in contact with a surface 19s of the insulated wall 19 of the power generation module 18 (serving as the heat source) by an attachment member. Alternatively, the first desulfurizer 100 may be attached to an upper surface or a lower surface of the insulated wall 19. The normal-temperature grained desulfurizing agent including the porous base material having zeolite is accommodated in the first desulfurizer 100. The heat of the power generation module 18 is transmitted to the first desulfurizer 100 by thermal conduction or by thermal radiation. As illustrated in FIG. 8, the first desulfurizer 100 includes a desulfurization chamber 101. The desulfurization chamber 101 is partitioned by plural partition plates 107 into plural portions. The partition plates 107 form plural opening portions 108 in the desulfurization chamber 101. The source gas flowing from an inlet port 101i of the desulfurization chamber 101 passes through the plural opening portions 108 so as to trace U-shapes along the partition plates 107 in the vertical direction of FIG. 8. As a result, the source gas secures a distance in which the source gas is desulfurized by the normal-temperature desulfurizing agent. Afterward, the source gas is discharged through an outlet port 101p of the desulfurization chamber 101 therefrom to the reformer. A thickness tx of the first desulfurizer 100 in a direction perpendicular to the vertical direction in FIG. 8 is shorter than a thickness ty of the power generation module 18 in the direction perpendicular to the vertical direction in FIG. 8. In addition, the first desulfurizer 100 is formed of a flattened box. Therefore, the first desulfurizer 100 may secure a large area by which the heat from the surface 19s of the insulated wall 19 is received.

For example, according to the seventh embodiment, in a case where the operation of the fuel cell system 400 is stopped in a long period of time, the insulated wall 19 of the power generation module 18 is not heated. In such case, it is appropriate for an electric heater 109 to be attached to an outer wall surface of the first desulfurizer 100. When the fuel cell system 400 is started, the electric heater 109 is turned on to heat the first desulfurizer 100 to 50° C. or higher. After the insulated wall 19 reaches the high temperature of 50° C. or higher, the electric heater 109 may be turned off. Alternatively, the electric heater 19 may be excluded from the fuel cell system 400 according to the seventh embodiment.

Eighth Embodiment

Figure 9:
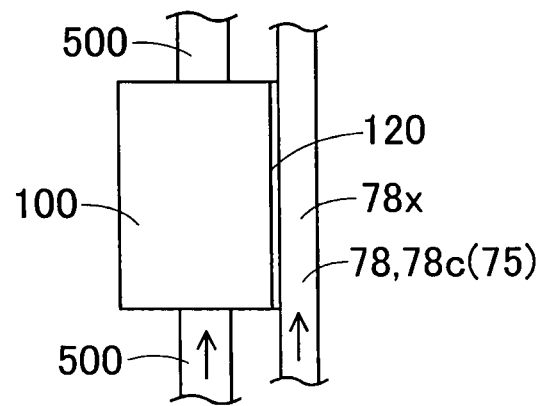
FIG. 9 is a conceptual figure illustrating the desulfurization unit arranged at the fuel cell system according to an eighth embodiment of the disclosure.

FIG. 9 illustrates the first desulfurizer 100 arranged at the fuel cell system 400 according to an eighth embodiment of the disclosure. As illustrate in FIG. 9, the first desulfurizer 100 used at high temperature accommodates the normal-temperature desulfurizing agent including the porous base material. The first desulfurizer 100 is welded or brazed to a pipe 78x by a contact portion 120 so as to extend side by side with the pipe 78x. The pipe 78x forms the return passage 78c of the hot-water passage 78. The first desulfurizer 100 is heated to 50° C. or higher by heat of the hot water (for example, at a temperature between 50° C. and 95° C.) flowing in the hot-water passage 78. According to the eighth embodiment, the first desulfurizer 100 is heated by the pipe 78x as described above. Alternatively, the first desulfurizer 100 may be heated by the combustion gas exhaust passage 75 through which the hot exhaust gas emitted from the reformer or the fuel cell flows.

Ninth Embodiment

Figure 10:
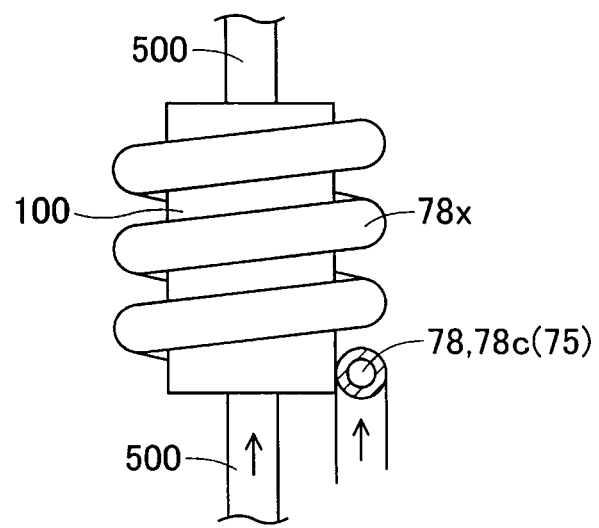
FIG. 10 is a conceptual figure illustrating the desulfurization unit arranged at the fuel cell system according to a ninth embodiment of the disclosure.

FIG. 10 illustrates the first desulfurizer 100 arranged at the fuel cell system 400 according to a ninth embodiment of the disclosure. As illustrated in FIG. 10, the pipe 78x forming the return 78c of the hot-water passage 78 is spirally wound around the first desulfurizer 100 accommodating the normal-temperature grained desulfurizing agent. The first desulfurizer 100 is heated to 50° C. or higher by the heat of the hot water (for example, at the temperature between 50° C. and 95° C.) flowing in the hot-water passage 78. According to the ninth embodiment, the first desulfurizer 100 is spirally wound around the pipe 78x as described above. Alternatively, the first desulfurizer 100 may be spirally wound around the combustion gas exhaust passage 75 through which the hot exhaust gas emitted from the reformer or the fuel cell flows.

The fuel cell system 400 and the desulfurization unit for the same that are described in the disclosure are not limited to the illustrations of the attached drawings and to the aforementioned embodiments. Alternatively, the fuel cell system 400 and the desulfurization unit that are explained in the disclosure may be modified as long as the fuel cell system 400 and the desulfurization unit do not depart from the purposes of the disclosure. The fuel cell system 400 may be a solid polymer fuel cell, a phosphoric acid fuel cell, or a molten carbonate fuel cell. In other words, a fuel cell system including a desulfurizer unit removing the sulfur compounds of the source gas therefrom may be applied as the fuel cell system 400 of the disclosure. The source gas explained in the disclosure includes the sulfur compounds and may be the city gas, LPG, a propane gas, a biogas, a CNG gas, or the like.

As described above, the desulfurization unit for the fuel cell system 400 includes the first desulfurizer 100 arranged in the temperature environment ranging from 50° C. to 200° C. and accommodating the normal-temperature desulfurizing agent having the porous material serving as the base material. The normal-temperature desulfurizing agent exerts the desulfurization effect in the normal temperature range. The first desulfurizer 100 adsorbs the sulfur compounds included in the source gas in the temperature environment ranging from 50° C. to 200° C. when the source gas having the low dew point is supplied through the source gas passage 500 to the first desulfurizer 100 and when the source gas having the high dew point is supplied through the source gas passage 500 to the first desulfurizer 100.

As descried above, the normal-temperature desulfurizing agent includes the porous base material including zeolite or activated carbon. The normal-temperature desulfurizing agent set at a temperature lower than 50° C. adsorbs more of the water vapor, therefore being damaged by the water vapor. Accordingly, the sulfur adsorption capacity of the normal-temperature desulfurizing agent is deteriorated by the water vapor. As a result, the sulfur compounds of the source gas are less adsorbed by the normal-temperature desulfurizing agent compared to the water vapor. However, for example, in a case where the normal-temperature desulfurizing agent is set in a high temperature range of 50° C. or higher, the water vapor is less adsorbed by the normal-temperature desulfurizing agent. Accordingly, the damage of the normal-temperature desulfurizing agent by the water vapor may be minimized. Consequently, the normal-temperature desulfurizing agent may appropriately adsorb the sulfur compounds from the source gas. As a result, an amount of the normal-temperature desulfurizing agent to be used for desulfurizing the source gas may be minimized. As described above, in a case where the normal-temperature desulfurizing agent including the porous base material having zeolite or activated carbon is set in the high temperature environment ranging from 50° C. to 200° C., the water vapor is less adsorbed by the normal-temperature desulfurizing agent. Consequently, the damage of the normal-temperature desulfurizing agent by the water vapor is minimized; therefore, the desulfurizing effect of the normal-temperature desulfurizing agent is refrained from deteriorating. In addition, the life-span of the normal-temperature desulfurizing agent may be refrained from shortening.

According to the configuration of the desulfurization unit described above, in a case where the source gas having the low dew point and including the small volume of water vapor is desulfurized by the normal-temperature desulfurizing agent while the amount of the normal-temperature desulfurizing agent to be used for desulfurizing the source gas is minimized, the sulfur compounds included in the source gas may be appropriately removed from the source gas by the normal-temperature desulfurizing agent. Likewise, in a case where the source gas having the high dew point and including the large volume of water vapor is desulfurized by the normal-temperature desulfurizing agent, the sulfur compounds included in the source gas may be appropriately removed from the source gas by the normal-temperature desulfurizing agent. Moreover, even in a case where the dew point of the source gas varies, the first desulfurizer 100 accommodating the normal-temperature desulfurizing agent is set in the temperature environment ranging from 50° C. to 200° C., the adsorption of the water vapor by the normal-temperature desulfurizing agent is minimized. As a result, the life-span of the normal-temperature desulfurizing agent may be refrained from shortening.

According to the second, third, fifth, and sixth embodiments, the desulfurization unit further includes the second desulfurizer 200 accommodating the normal-temperature desulfurizing agent including the porous material serving as the base material. The normal-temperature desulfurizing agent exerts a desulfurization effect in the normal temperature range. The second desulfurizer 200 is arranged in the temperature environment that is lower than 50° C. The second desulfurizer 200 is positioned in series with the first desulfurizer 100 and at the upstream side or the downstream side of the first desulfurizer 100 in the flow direction of the source gas.

In the case where the second desulfurizer 200 is arranged in series with the first desulfurizer 100 and at the upstream side or the downstream side of the first desulfurizer 100 in the flow direction of the source gas as described above, both the source gas having the low dew point and the source gas having the high dew point may be desulfurized by the desulfurization unit according to each of the aforementioned embodiments. Further, when the source gas having the high dew point is supplied to the desulfurization unit in a case where the first desulfurizer 100 is positioned at the upstream of the second desulfurizer 200 in the flow direction of the source gas, the sulfur compounds of the source gas are preferentially removed from the source gas by the first desulfurizer 100 that is insusceptible to the water vapor. At this time, the water vapor may be minimized; therefore, the second desulfurizer 200 that is susceptible to the water vapor may be refrained from being damaged by the water vapor. Furthermore, when the source gas having the high dew point is supplied to the desulfurization unit even in a case where the second desulfurizer 200 is positioned at the upstream of the first desulfurizer 100, the first desulfurizer 100 that is insusceptible to the water vapor may remove the sulfur compounds from the source gas.

According to the modified example of the second embodiment and the fourth embodiment, the desulfurization unit further includes the second desulfurizer 200 accommodating the normal-temperature desulfurizing agent exerting the desulfurization effect in the normal temperature range. The second desulfurizer 200 is arranged in the temperature environment that is lower than 50° C. The second desulfurizer 200 is positioned in parallel with or in series with the first desulfurizer 100. The desulfurization unit further includes the valves 571, 572, 531, 541, 532, 542 switching the source gas between a first state where the source gas is supplied to the first desulfurizer 100 and a second state where the source gas is supplied to the second desulfurizer 200 depending on the dew point of the source gas.

According to the configuration of the desulfurization unit described above, both the source gas having the low dew point and the source gas having the high dew point may be appropriately desulfurized.

According to the example of the application of the aforementioned embodiments, the fuel cell system 400 includes the fuel cell 1 having the anode 10 and the cathode 11, the cathode gas exhaust passage 104 supplying the cathode gas to the cathode 11 of the fuel cell 1, the reformer 2A reforming the source gas to generate the anode gas, the reformer 2A configuring a portion of the power generation module 18, the source gas passage 6 supplying the source gas from the gas source 63 to the reformer 2A, the desulfurization unit arranged at the source gas passage 6 and desulfurizing the source gas, and the anode gas passage 73 supplying the anode gas generated by the reformer 2A to the anode 10 of the fuel cell 1, the desulfurization unit including the first desulfurizer 62 arranged in the temperature environment ranging from 50° C. to 200° C. and accommodating the normal-temperature desulfurizing agent including the porous material serving as the base material, the normal-temperature desulfurizing agent exerting the desulfurization effect in the normal temperature range, the first desulfurizer 62 adsorbing the sulfur compounds included in the source gas in the temperature environment ranging from 50° C. to 200° C. when the source gas having the low dew point is supplied through the source gas passage 6 to the first desulfurizer 62 and when the source gas having the high dew point is supplied through the source gas passage 6 to the first desulfurizer 62.

According to the fuel cell system 400 configured as described above, in a case where the source gas having the low dew point and including the small volume of water vapor is desulfurized by the normal-temperature desulfurizing agent while the amount of the normal-temperature desulfurizing agent to be used for desulfurizing the source gas is minimized, the sulfur compounds included in the source gas may be appropriately removed from the source gas by the normal-temperature desulfurizing agent. Likewise, in a case where the source gas having the high dew point and including the large volume of water vapor is desulfurized by the normal-temperature desulfurizing agent, the sulfur compounds included in the source gas may be appropriately removed from the source gas by the normal-temperature desulfurizing agent. Moreover, even in a case where the dew point of the source gas varies, the first desulfurizer 62 accommodating the normal-temperature desulfurizing agent is set in the temperature environment ranging from 50° C. to 200° C., the adsorption of the water vapor by the normal-temperature desulfurizing agent is minimized. As a result, the life-span of the normal-temperature desulfurizing agent may be refrained from shortening.

According to the example of the application of the aforementioned embodiments, the first desulfurizer 62 receives the heat from the reformer 2A or the power generation module 18, or the heat from the combustion gas exhaust passage 75 to reach the temperature ranging from 50° C. to 200° C. The combustion gas exhaust passage 75 receives the combustion gas emitted from the reformer 2A or the power generation module 18.

According to the fuel cell system 400 configured as described above, the heat from the reformer 2A or the combustion gas exhaust passage 75 is effectively utilized; thereby, the first desulfurizer 62 may be heated.

According to the example of the application of the aforementioned embodiments, the fuel cell system 400 further includes the hot-water passage 78 through which the hot water heated by the power generating operation of the fuel cell system 400 flows, and the hot-water chamber 77 connected to the hot-water passage 78. The hot-water chamber 77 stores the hot water supplied from the hot-water passage 78. The first desulfurizer 62 receives the heat from at least one of the hot-water passage 78 and the hot-water chamber 77 to reach the temperature ranging from 50° C. to 200° C.

According to the fuel cell system 400 configured as described above, the heat from the hot-water passage 78 or the hot-water chamber 77 is effectively utilized; thereby, the first desulfurizer 62 may be heated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A desulfurization unit for a fuel cell system, the desulfurization unit comprising:
a first desulfurizer arranged in a temperature environment ranging from 50° C. to 200° C. and accommodating a desulfurizing agent including a porous material serving as a base material, the desulfurizing agent exerting a desulfurization effect in a normal temperature range, wherein the first desulfurizer is adapted to absorb a sulfur compound included in a source gas in the temperature environment ranging from 50° C. to 200° C. when the source gas having a low dew point is supplied through a source gas passage to the first desulfurizer and when the source gas having a high dew point is supplied through the source gas passage to the first desulfurizer; and
a second desulfurizer accommodating a desulfurizing agent including a porous material serving as a base material, the desulfurizing agent exerting a desulfurization effect in a normal temperature range, wherein the second desulfurizer is arranged in a temperature environment that is lower than 50° C., and the second desulfurizer is positioned in series with the first desulfurizer and at a downstream side of the first desulfurizer in a flow direction of the source gas.

2. A desulfurization unit for a fuel cell system, the desulfurization unit comprising:
a first desulfurizer arranged in a temperature environment ranging from 50° C. to 200° C. and accommodating a desulfurizing agent including a porous material serving as a base material, the desulfurizing agent exerting a desulfurization effect in a normal temperature range, wherein the first desulfurizer is adapted to absorb a sulfur compound included in a source gas in the temperature environment ranging from 50° C. to 200° C. when the source gas having a low dew point is supplied through a source gas passage to the first desulfurizer and when the source gas having a high dew point is supplied through the source gas passage to the first desulfurizer;
a second desulfurizer accommodating a desulfurizing agent exerting a desulfurization effect in a normal temperature range, the second desulfurizer being arranged in a temperature environment that is lower than 50° C., wherein the second desulfurizer is positioned in parallel with or in series with the first desulfurizer; and
a valve switching the source gas between a first state where the source gas is supplied to the first desulfurizer and a second state where the source gas is supplied to the second desulfurizer depending on the dew point of the source gas.

3. A fuel cell system, comprising:
a fuel cell including an anode and a cathode;
a cathode gas exhaust passage supplying a cathode gas to the cathode of the fuel cell;
a reformer reforming a source gas to generate an anode gas, the reformer configuring a portion of a power generation module;
a source gas passage supplying the source gas from a gas source to the reformer;
a desulfurization unit arranged at the source gas passage and adapted to desulfurize the source gas; and
an anode gas passage supplying the anode gas generated by the reformer to the anode of the fuel cell,
wherein the desulfurization unit is the desulfurization unit of claim 1.

4. The fuel cell system according to claim 3, wherein the first desulfurizer receives heat from the reformer or the power generation module, or heat from a combustion gas exhaust passage to reach the temperature ranging from 50° C. to 200° C., the combustion gas exhaust passage receiving a combustion gas emitted from the reformer or the power generation module.

5. The fuel cell system according to claim 3, further comprising a hot-water passage through which hot water heated by a power generating operation of the fuel cell system flows, and a hot-water chamber connected to the hot-water passage, the hot-water chamber storing the hot water supplied from the hot-water passage, wherein the first desulfurizer receives heat from at least one of the hot-water passage and the hot-water chamber to reach the temperature ranging from 50° C. to 200° C.

6. A fuel cell system, comprising:
a fuel cell including an anode and a cathode;
a cathode gas exhaust passage supplying a cathode gas to the cathode of the fuel cell;
a reformer reforming a source gas to generate an anode gas, the reformer configuring a portion of a power generation module;
a source gas passage supplying the source gas from a gas source to the reformer;
a desulfurization unit arranged at the source gas passage and adapted to desulfurize the source gas; and
an anode gas passage supplying the anode gas generated by the reformer to the anode of the fuel cell,
wherein the desulfurization unit comprises:
a first desulfurizer arranged in a temperature environment ranging from 50° C. to 200° C. and accommodating a desulfurizing agent including a porous material serving as a base material, the desulfurizing agent exerting a desulfurization effect in a normal temperature range, wherein the first desulfurizer is adapted to absorb a sulfur compound included in the source gas in the temperature environment ranging from 50° C. to 200° C. when the source gas having a low dew point is supplied through a source gas passage to the first desulfurizer and when the source gas having a high dew point is supplied through the source gas passage to the first desulfurizer; and
a second desulfurizer accommodating a desulfurizing agent exerting a desulfurization effect in a normal temperature range, the second desulfurizer being arranged in a temperature environment that is lower than 50° C., the second desulfurizer being positioned in parallel with or in series with the first desulfurizer, and
wherein the fuel cell system further comprises a valve switching the source gas between a first state where the source gas is supplied to the first desulfurizer and a second state where the source gas is supplied to the second desulfurizer depending on the dew point of the source gas.

* * * * *